Figure 1:
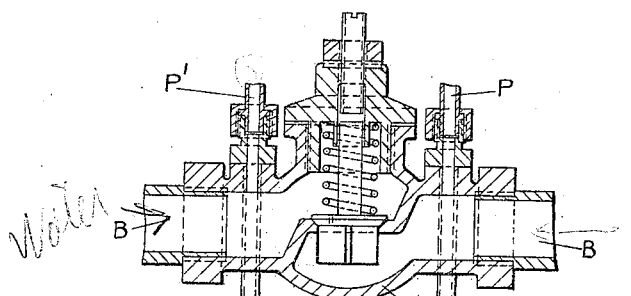

J. LOWE.
AUTOMATIC MEANS FOR CONTROLLING THE GAS SUPPLY TO GAS HEATED WATER HEATERS.
APPLICATION FILED NOV. 25, 1916.

1,303,929.

Patented May 20, 1919.
2 SHEETS—SHEET 1.

James Lowe
Inventor
by [signature]
Attorney

James Lowe
Inventor
by Lawrence Langner
Attorney

UNITED STATES PATENT OFFICE.

JAMES LOWE, OF AUCKLAND, NEW ZEALAND.

AUTOMATIC MEANS FOR CONTROLLING THE GAS-SUPPLY TO GAS-HEATED WATER-HEATERS.

1,303,929.  Specification of Letters Patent.  Patented May 20, 1919.

Application filed November 25, 1916. Serial No. 133,481.

*To all whom it may concern:*

Be it known that I, JAMES LOWE, a subject of His Majesty the King of the United Kingdom of Great Britain and Ireland, resident of Beaumont street, in the city of Auckland, in the Provincial District of Auckland and Dominion of New Zealand, have invented new and useful Improvements in Automatic Means for Controlling the Gas-Supply to Gas-Heated Water-Heaters, of which the following is a specification.

This invention relates to automatically operated means for controlling the supply of gas to gas heated water heaters.

The object of the invention is to provide an improved automatically operated gas control device, which is operated by the flow of water through either the water inlet or outlet pipe of the heater, such flow of water being caused by turning on any of the draw off cocks on the water outlet pipe or hot water system with which the heater may be connected, or by opening a control cock on the water inlet pipe.

The invention consists in placing on the gas supply pipe to the heater a special construction of gas valve casing containing diaphragms, or plungers, pistons or rams, so arranged that each opposes the motion of the other, and in placing on either the water inlet or outlet pipe a water pressure reducing device, the pressures created in which are transmitted to the gas valve casing and directed against the diaphragms, or plungers, pistons or rams therein, so as to operate the mechanism which opens and closes the gas passage through the valve. Two pipe or tubular connections are made between the water pressure reducing device and the gas valve casing, one of the connections leading from the inlet side of the pressure reducing device and being directed against the diaphragm or plunger, piston or ram which operates to effect the opening of the gas passage through the gas valve, and the other leading from the outlet side of the pressure reducing device and being directed against the diaphragm or plunger, piston or ram which operates to effect the closing of said gas passage.

On a flow of water taking place as before mentioned, the differential pressures created in the pressure reducing device are transmitted simultaneously to the gas valve casing, the greater pressure from the inlet side of said pressure reducing device overcoming the resistance of the lesser pressure from the outlet side of said device, and effecting the opening of the gas passage in the gas valve casing.

When said flow of water ceases the inlet and outlet pressures of the reducing device become equal and to enable the outlet pressure to overcome the resistance of the inlet pressure and effect the closing of the gas passage the diaphragm or plunger piston or ram against which said outlet pressure is directed is given a greater area or leverage than the diaphragm or plunger, piston or ram against which the inlet pressure is directed.

In order that the invention may be more clearly understood it will be further described with reference to the accompanying drawings in which:—

Figure 2:
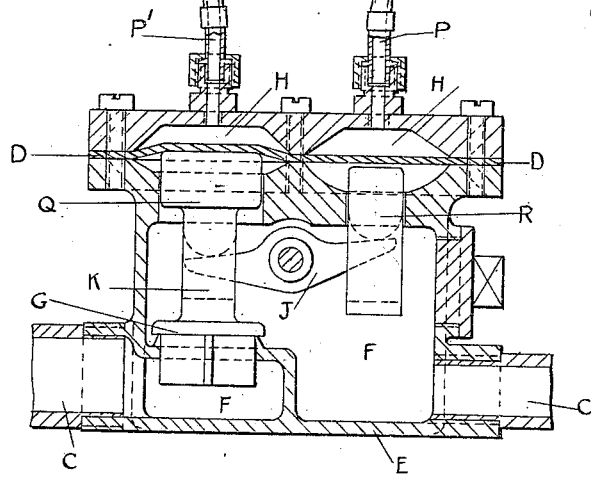
Figure 3:
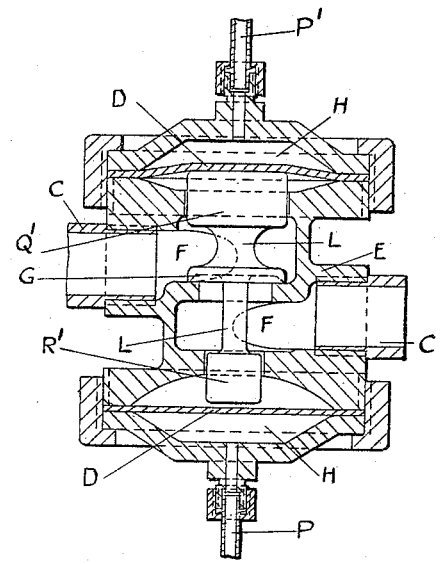
Figure 4:
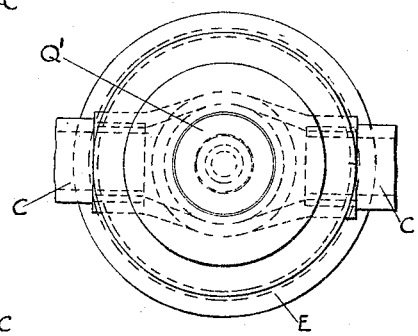
Figure 5:
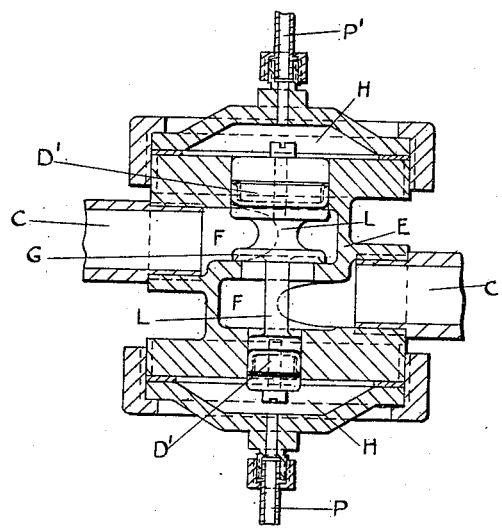

Figure 1 is a sectional elevation of a water pressure reducing device in the form of a spring weighted reducing valve connected with one form of gas valve, Fig. 2 is a plan view of the same valve casing with the cover removed, Fig. 3 is a sectional elevation of an alternative form of gas valve casing, Fig. 4 is a plan view of the gas valve casing illustrated in Fig. 3, Fig. 5 is a sectional elevation of a gas valve casing showing the diaphragms replaced, by plungers or pistons.

Figure 6:
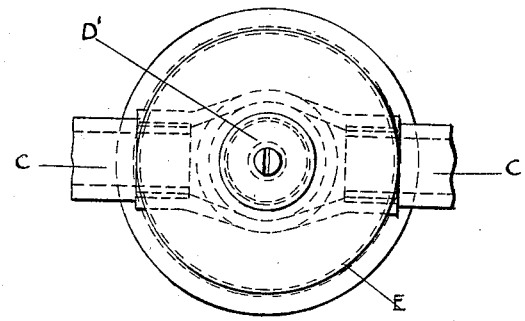

Fig. 6 is a plan view of the valve casing shown in Fig. 5.

The water pressure reducing device A situated on the water pipe B which can be either the inlet or outlet pipe, is shown in Fig. 1 as a spring weighted reducing valve, but the device need not necessarily be confined to this construction, as any form of valve or reducing device which will serve the purpose can be employed.

On the gas supply pipe C to the heater is provided the gas valve casing E, the gas passage F through which, is opened and closed by a valve disk G or its equivalent, operated as the result of the direction of the water pressure against the diaphragms D or the plungers, pistons or rams D'.

In the construction of gas valve casing shown in Figs. 2 and 3 the diaphragms D which are composed of leather, rubber, or any other suitable flexible material, are secured across chambers H arranged side by side, and in order that the diaphragms D may each oppose the motion of the other, a centrally pivoted lever J is provided on one end of which presses a plunger R bearing at its upper end against the diaphragm D designed to effect the opening of the gas passage F.

The other end of said lever J engages the vertical rod or stem K of the valve disk G or its equivalent, the upper end of said rod or stem K being provided with a flat portion Q against which bears the diaphragm D designed to effect the closing of the gas passage F.

In the form of gas valve casing illustrated in Figs. 4 and 5 the valve disk G or its equivalent is mounted on a stem or rod L the ends of which are provided with flat portions or disks Q' R', the diaphragms D in this case each opposing the motion of the other by being secured across chambers H one above the other and each bearing against one of the flat portions or disks Q' R'.

The diaphragms D in either construction of gas valve casing can be replaced by the plungers or pistons D' (Fig. 5).

When a flow of water occurs through the device A the pressure transmitted through the connecting pipe P being greater than that transmitted through the other connecting pipe P' causes the diaphragm D or plunger or piston D' against which the greater pressure is directed to operate so as to cause the valve disk G or its equivalent to lift, and provide free course for the gas through the passage F, but immediately the flow of water ceases, and the pressure in the pipes P and P' becomes equal, the diaphragm D or plunger or piston D' designed to effect the closing of the passage F on account of its greater area or leverage asserts itself and causes the valve disk G or its equivalent to close the passage F, and cut off the supply of gas to the heater through the gas valve casing E. The water pressure reducing device A is not shown in connection with Figs. 3 and 5, but it will be readily understood that the connecting pipes for the gas valve E shown in the aforesaid figures are connected to a typical device such as that shown in connection with Fig. 1.

I claim:—

1. In an automatic water heater and in combination, a water pressure reducing device on a water pipe; a gas valve casing on a gas pipe; opposed plungers of unequal area within said gas valve casing; a water pressure pipe from the inlet side of said water pressure reducing device to said gas valve casing opposite the smaller plunger; a water pressure pipe from the outlet side of said water pressure reducing device to said gas valve casing opposite the larger plunger; a gas chamber in said casing and a gas valve operated by the action of unequal water pressures on said plungers to permit the passage of gas through said chamber, and operated by the action of equal water pressures on said plungers to prevent the passage of gas through said chamber.

2. In an automatic water heater and in combination, a spring weighted valve on a water pipe; a gas valve casing on a gas pipe; water pressure chambers and a gas chamber in said casing; flexible diaphragms secured across said water pressure chambers; opposed plungers of unequal area entering said water pressure chambers; a water pressure pipe from the inlet side of said spring weighted valve to said gas valve casing opposite the smaller plunger; a water pressure pipe from the outlet side of said spring weighted valve to said gas valve casing opposite the larger plunger; a gas valve in said gas chamber, operated by the action of unequal water pressures on said plungers to permit the passage of gas through said gas chamber, and operated by the action of equal water pressures on said plungers to prevent the passage of gas through said gas chamber.

JAMES LOWE.

Witness:
ERNEST WILFRED BOYCE CAREY.